United States Patent [19]

Rudolph

[11] Patent Number: 4,691,464
[45] Date of Patent: Sep. 8, 1987

[54] AVIAN DECOY COVERING

[75] Inventor: Thomas E. Rudolph, David City, Nebr.

[73] Assignee: Eidos Corporation, David City, Nebr.

[21] Appl. No.: 889,216

[22] Filed: Jul. 25, 1986

[51] Int. Cl.⁴ .......................................... A01M 31/06
[52] U.S. Cl. ........................................................ 43/3
[58] Field of Search ........................................ 43/2, 3

[56] References Cited

U.S. PATENT DOCUMENTS

| 430,565 | 6/1890 | Curlin | 43/3 |
| 547,033 | 10/1895 | Ross | 43/3 |
| 1,306,655 | 6/1919 | Bacho | 43/3 |
| 1,697,465 | 1/1929 | Kempf | 43/3 |
| 2,755,588 | 7/1956 | Johnson | 43/3 |
| 3,254,439 | 6/1966 | Hansen | 43/3 |
| 4,318,240 | 3/1982 | Hillesland | 43/3 |

Primary Examiner—M. Jordan
Attorney, Agent, or Firm—Kokjer, Kircher, Bradley, Wharton, Bowman & Johnson

[57] ABSTRACT

A flexible fabric covering for avian decoys for enhancing the life-like accuracy of the decoy. Markings are illustrated on the exterior of the covering and represent the surface features of a wildfowl. A reflective iridescent panel is attached to the covering at substantially the location of a duck's secondary feathers to mimic the iridescence of the secondary feathers. The covering is removably secured to the decoy by a drawstring or elastic band.

16 Claims, 3 Drawing Figures

U.S. Patent     Sep. 8, 1987     4,691,464
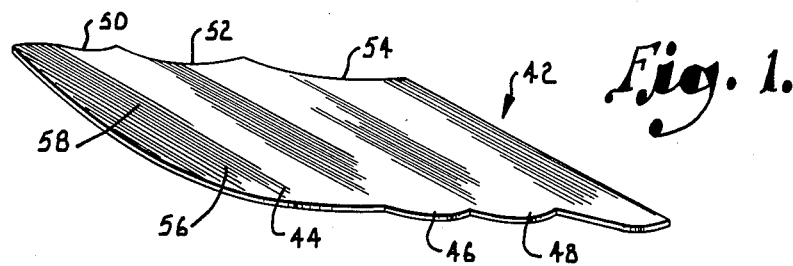
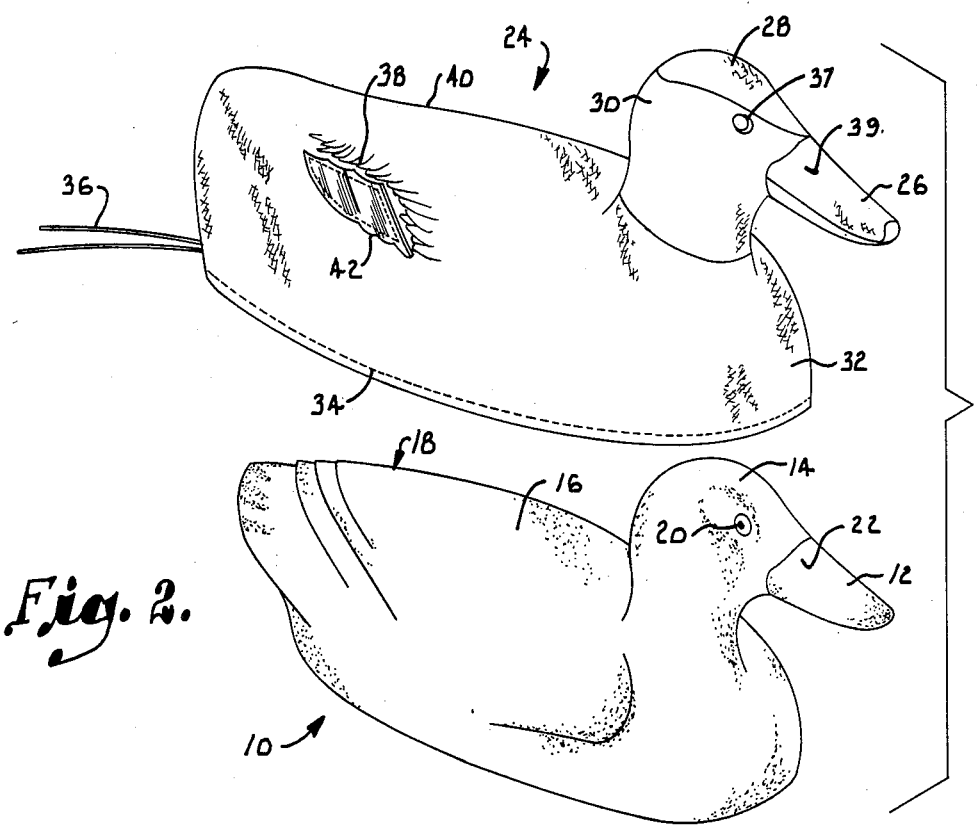
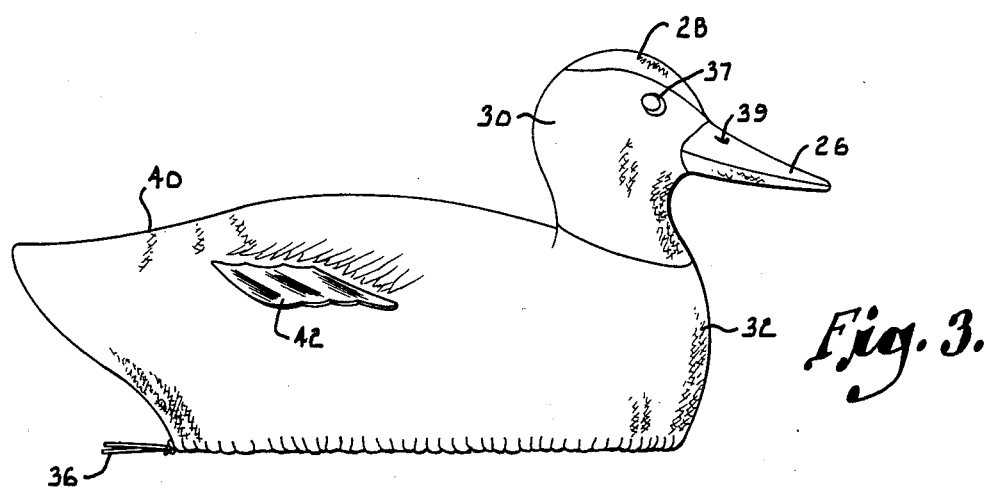

AVIAN DECOY COVERING

BACKGROUND OF THE INVENTION

This invention relates to avian decoys used to attract or repel wildfowl.

Avian decoys have long been used by hunters to attract waterfowl and other game birds. Migrating wildfowl are usually beyond the range of a shotgun (or other weapon) and decoys are used to draw the birds within shooting range. The number and arrangement of the decoys may be varied, but they are typically placed in a body of water or arranged along a shoreline where the shape of the decoy serves to initially attract the overflying wildfowl.

Decoys are also used by bird watchers to attract birds for observation rather than for harvesting purposes. Decoys depicting predatory birds have also been used to protect crops from scavenging by other birds.

Typically, these decoys are constructed of wood or plastic molded into the shape of a particular bird with its wings in a folded position. Two-dimenstional silhouette decoys are also used and are molded from a variety of materials. Due to the keen eyesight of birds, decoys often have a rough representation of the surface features of the bird painted on the exterior surface of the decoy to enhance the life-like realism of the decoy. These surface features, however, weather and fade after repeated exposure to the elements and transport to and from the hunting area, reducing the life-like qualities of the decoys and, consequently, their effectiveness on wildfowl. The solid three-dimensional decoys and silhouette decoys are also limited in that they are of a fixed gender and species.

SUMMARY OF THE INVENTION

It is an object of this invention to provide a decoy covering with exterior markings which detail the surface features of a bird.

Another object of this invention is to provide a removable decoy covering which allows the gender and species of a decoy to be quickly and easily changed.

A further object of this invention is to provide a decoy covering which may be easily removed from the decoy to prevent damage to the covering during transport of the decoy.

A still further object of this invention is to provide, in a decoy of the character described, a flexible, removable covering which permits a unique display of secondary feathers thereupon.

Accordingly, the decoy of the present invention comprises a covering designed to slip over conventional decoys. The covering comprises a flexible fabric with markings on the exterior surface which represent the surface features of a bird; however, they are also supplied with reflective panels placed at the location of secondary feathers of a bird when the bird's wings are folded. These panels mimic the iridescence of the bird's brightly colored secondary feathers thereby further enhancing the life-like qualities of the decoy.

BRIEF DESCRIPTION OF THE DRAWINGS

In the accompanying drawing which forms a part of the specification and is to be read in conjunction therewith and in which like reference numerals are used to indicate like parts in the various views:

FIG. 1 is a perspective view of a reflective panel of the present invention;

FIG. 2 is a perspective view of a decoy covering of the present invention placed above a conventional decoy; and FIG. 3 is a side elevation view of a decoy covering of the present invention coupled with a conventional decoy.

DESCRIPTION

Referring now to the drawings, a conventional avian decoy is represented by the numeral 10 and includes a bill portion 12, a head portion 14, and a body portion 16. The decoy 10 is formed from wood or other suitable materials, has a rigid exterior surface 18, and is buoyant. The decoy illustrated is shaped in a three-dimensional representation of a duck, but it is to be understood that other species of birds as well as silhouettes of birds may be used with a decoy covering of the present invention. Surface features such as an eye 20 and a nostril 22 are illustrated on the exterior surface 18.

A decoy covering of the present invention is represented by the numeral 24. The covering 24 is constructed of a flexible fabric and comprises a bill portion 26, a crow portion 28, a head portion 30 and a body portion 32. These portions 26, 28, 30 and 32 are sewn together to form the covering 24 which substantially covers the exterior surface 18 of the decoy 10. The covering 24 has an open bottom portion 34 around which a drawstring 36 (or elasticized strip) is sewn.

Any type of natural markings (such as eye marking 37, feather markings 38 and nostril marking 39) representing the color and shape of surface features of a duck may be illustrated on an exterior surface 40 of the covering 24. The markings 37, 38 and 39 may be created by the various conventional means such as hand painting, printing or silk-screening.

In addition, a reflective panel 42 is sewn to the exterior surface 40 at substantially the location of the duck's secondary feathers when the duck's wings are in a folded position. The panel 42 may also be independently attached directly to an existing decoy by means of adhesive applied on the back of the reflective panel. Most ducks have brightly colored, iridescent secondary feathers, which are referred to as the speculum, and which, in the folded wing position, are exposed to varying degrees. The panel 42 is in the shape of the exposed speculum and has outwardly projecting convex portions 44, 46 and 48 representing the secondary feathers and inwardly projecting concave portions 50, 52 and 54 representing the wing covert feathers which cover a portion of the secondary feathers when the wing is folded. The panel 42 has an upper surface 56 with a plurality of parallel ridges 58 and has an iridescent changing color when viewed at different angles. This optical feature is created by a conventional linearoptic printing process in which lenses are combined with graphics in such a way that the lenses hide a part of the image which is revealed as the viewing angle is changed.

In use, the decoy covering 24 is easily slipped over the decoy 10. The covering 24 substantially covers the exterior surface 18 and the flexible nature of the fabric allows for a tight fit of the covering to the decoy. The drawstring 36 may then be tightened to secure the snug fit irrespective of the age of the covering.

Accordingly, an old, scuffed-up decoy with an attractive cover may then be anchored in a body of water or placed along the shoreline. The markings 37, 38 and 39 and the panel 42 which mimics the iridescence of the duck's speculum provide an accurate representation of the surface features of the duck and enhance the realism of the decoy. The covering 24 may be removed after use to reduce damage to the cover during transport of the decoy 10. Hence, the user now has an inexpensive alternative to the purchase of new decoys.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A removable covering for a bird decoy, said covering comprising:
    a flexible fabric having a size to substantially cover said decoy and having a shape to substantially conform to the shape of said decoy, said fabric having an exterior surface;
    markings on said exterior surface to simulate the surface features of a bird corresponding to the decoy; and
    a reflective panel mounted on the exterior of the fabric at a location substantially coincident with the location of secondary feathers on at least one side of said bird.

2. The covering of claim 1 including releaseable means for securing said covering to said decoy and allowing removal of said covering from said decoy.

3. The covering of claim 1 wherein said panel comprises a material having a surface which emits differing qualities of light when viewed at differing angles with respect to said surface.

4. The covering of claim 1 wherein said fabric comprises body, head and bill portions.

5. An avian decoy comprising:
    a body portion having an outer surface shaped in a representation of a bird; and
    a reflective panel coupled with the outer surface of said body portion at a location substantially coincident with the location of at least a portion of secondary bird feathers.

6. The decoy of claim 5 wherein said body portion outer surface is shaped in a three-dimensional representation of the bird.

7. The decoy of claim 5 wherein said body portion outer surface is shaped to represent a silhouette of the bird.

8. The decoy of claim 5 wherein said body portion is buoyant.

9. The decoy of claim 5 wherein said panel comprises a material having a surface which emits differing qualities of light when viewed at differing angles with respect to said surface.

10. A bird decoy comprising:
    a rigid body portion having an outer surface shaped in a representation of a bird;
    a removable fabric covering disposed on and substantially covering the outer surface of said body portion, said covering having an exterior surface;
    markings on said exterior surface to simulate surface features of said bird; and
    a reflective panel coupled with the exterior surface at a location substantially coincident with the location of secondary bird feathers.

11. The decoy of claim 10 including releaseable means coupled with the covering for securing said covering to the body portion and allowing removal of said covering from said base.

12. The decoy of claim 10 wherein said covering comprises body, head and bill portions.

13. The decoy of claim 10 wherein said panel has a surface which emits differing qualities of light when viewed at differing angles with respect to said surface.

14. The decoy claim 10 wherein said base is buoyant.

15. The decoy of claim 10 wherein said body portion outer surface is shaped in a three-dimensional representation of the bird.

16. The decoy of claim 10 wherein said body portion outer surface is shaped to represent a silhouette of the bird.

* * * * *